Dec. 9, 1941.   W. BÜNGER ET AL   2,265,264
PRISM ARRANGEMENT FOR PRODUCING DOUBLE IMAGES, PARTICULARLY
FOR TELEVISION PURPOSES
Filed Feb. 5, 1938

Inventor
Walter Bünger
Erich Koosche

By
Lippincott, Metcalf   Attorney

Patented Dec. 9, 1941

2,265,264

UNITED STATES PATENT OFFICE 2,265,264

PRISM ARRANGEMENT FOR PRODUCING DOUBLE IMAGES, PARTICULARLY FOR TELEVISION PURPOSES

Walter Bünger and Erich Kosche, Berlin-Zehlendorf, Germany, assignors to the firm of Fernseh Aktiengesellschaft, Zehlendorf, near Berlin, Germany Application February 5, 1938, Serial No. 189,010
In Germany February 6, 1937

2 Claims. (Cl. 88—1)

In our co-pending application, Ser. No. 174,122, filed November 11, 1937, now Patent No. 2,218,498, issued October 15, 1940, a method for interlaced television transmission is described in which two images displaced by one-half the height of the image are optically projected and then scanned in a suitable manner. The present application is a continuation-in-part of that application.

It is of greatest importance thereby that the optical images have no lateral displacement with respect to each other and are displaced in height with an accuracy of fractions of a scanning line width because the two partial images do not otherwise coincide in the receiver, whereby a blurred image results. Furthermore, it is necessary that no optical distortion of the two partial images occurs and that the two images are not rotated with respect to each other, because, while individual parts of the image may be clear in the receiver, it is not possible to obtain a uniform sharpness of the entire image.

It is, for instance, extremely difficult to obtain images free of distortion and rotation with a device using wedge-shaped prisms. Perfect reproduction is possible only if the paths of the rays through both wedge-shaped prisms are exactly symmetrical and the edges of the prisms are exactly parallel to each other.

The method shown in the above-mentioned patent, using two plane-parallel prisms, is preferable because no rotation occurs if the prism planes are parallel. The lateral and vertical adjustment, however, is also rather difficult in this case.

A further difficulty is due to the fact that the prisms effect a parallel displacement of the optical images which must amount to exactly one-quarter of the height of an image per prism. This determines the height of the individual prism. However, as the size of the image on the cathode of the picture-analyzing tube is limited for electron-optical reasons, it happens that objectives with long focal length are only partially utilized because of the limited size of the prisms. This results in a loss of light.

Our invention will be better understood by reading the following description in conjunction with the accompanying drawing, in which.

Figure 1:
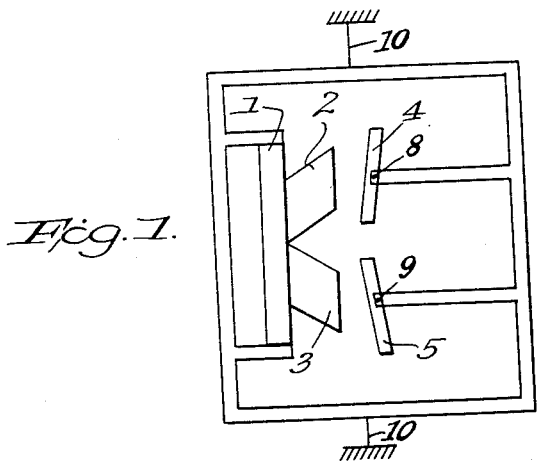
Fig. 1 is a schematic showing of one embodiment of our invention.

It is the object of the invention to eliminate these difficulties by means of a special construction of the double prism system. Freedom from rotation of the optical image for plane-parallel prisms is obtained according to the invention by shrinking the two prisms upon, or cementing them into a fixed position on, a plane-parallel plate 1, as shown in Fig. 1, whereby it is preferable to let the rectangular edges touch. The plane-parallel plate 1 carries the two prisms 2 and 3. The prisms in Fig. 1 are disposed on the side of the plate remote from the film, that is, the film is placed on the left side of the prisms in the drawing and the photosensitive cathode on the right side. Two oblique plane parallel plates, 4 and 5, are provided in front of the prisms, which plates serve to adjust the height of the images on the cathode. The adjustment is obtained by rotating the plates around the axes 8 and 9, respectively, which are perpendicular to the plane of the drawing, whereby a rotation of the image does not occur. The lateral adjustment is accomplished by rotating the entire prism system together with the plane-parallel plates around an axis 10 running from the top to the bottom of Fig. 1. The plate 1 can also be arranged on the opposite side of the prisms in order to be able to bring the prisms into closer proximity of the objective.

Figure 2:
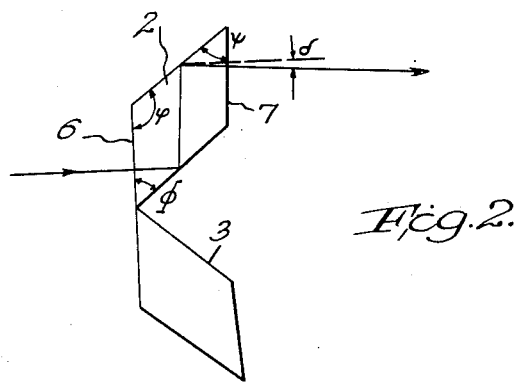
Fig. 2 is a view illustrating a modification of our invention.

In order to avoid the above-mentioned second disadvantage, namely, the limitation of the prism size, determined by the dimensions of the photosensitive cathode, and in order to be able to use larger prisms and thereby larger apertures in the objective, the prisms are not carried out as plane-parallel prisms but may be given the shape illustrated in Fig. 2. The plane of incidence and the plane of emergence are no longer parallel to each other, but form an angle of deflection $\delta$. Such a prism effects not only a displacement of the image by parallel displacement of the light rays, but also a displacement of the image by changing the direction of the light rays, whereby there is no possibility of a rotation of the image occurring. Such a prism behaves like a plane-parallel plate with respect to the rotation of the image, that is, it does not cause any distortions and simultaneously effects an angular deflection of the rays.

In Fig. 2 the angles between the planes of the prism are indicated by $\psi.\phi.\chi$. In order that the prism may possess the required quality an incident ray normal to the plane 6 must emerge from the surface 7 as a normal to that surface. In order to fulfill this requirement, the following relation must exist between the angles of the prism:

$\chi = 2\phi + \psi - 180°$. The angle of deflection $\delta$ will then be: $\delta = 2(180 - \phi - \psi)$.

Having thus described our invention, we claim:

1. A prism system for use in a television transmission system, comprising a pair of prisms mounted with one side of each prism in a plane perpendicular to the entering light beam and with an adjacent side of one prism touching and forming an acute angle with the corresponding side of the other prism, a plane-parallel plate in the beam of light emerging from each prism and pivoted about an axis parallel to the rectangular edges of said prisms, and mounting means supporting said prisms and said plates and being pivoted about an axis parallel to said plane and perpendicular to the axes of said plates.

2. A prism system for use in a television transmission system, comprising a first plane-parallel plate disposed perpendicularly to the entering light beam, a pair of prisms mounted with one side of each prism in contact with a side of said first plate and with an adjacent side of one prism touching and forming an acute angle with the corresponding side of the other prism, second and third plane-parallel plates respectively in the beam of light emerging from each prism and pivoted about axes parallel to the rectangular edges of said prisms, and mounting means supporting said prisms and said plates and being pivoted about an axis parallel to said first plate and perpendicular to the axes of said second and third plates.

WALTER BÜNGER.
ERICH KOSCHE.